United States Patent [19]

Sanders

[11] Patent Number: 4,522,496
[45] Date of Patent: Jun. 11, 1985

[54] LASER GYRO MODE LOCKING REDUCTION SCHEME

[75] Inventor: Virgil E. Sanders, Newbury Park, Calif.

[73] Assignee: Litton Systems, Inc., Beverly Hills, Calif.

[21] Appl. No.: 246,457

[22] Filed: Mar. 23, 1981

Related U.S. Application Data

[63] Continuation-in-part of Ser. No. 068,244, Aug. 17, 1979, abandoned, which is a continuation of Ser. No. 909,919, May 26, 1978, abandoned.

[51] Int. Cl.$^3$ ............................................. G01C 19/64
[52] U.S. Cl. ...................................... 356/350; 372/94
[58] Field of Search ........................... 356/350; 372/94

[56] References Cited

U.S. PATENT DOCUMENTS 3,697,181 10/1972 Macek et al. ........................ 356/350
3,862,803 1/1975 Yntema et al. ...................... 356/350

OTHER PUBLICATIONS

"Effects of Multiple Modes on the Beats in a Ring Laser", Kruglik et al., J. Appl. Spectrosc., vol. 14, No. 1, Jan. 1971, pp. 46-50.

Primary Examiner—Vincent P. McGraw
Attorney, Agent, or Firm—Gerald L. Cline

[57] ABSTRACT

A ring laser gyroscope is described having two counterpropagating primary modes and one or more secondary laser modes having a component c cos ω t to produce a dithering effect which reduces or eliminates the lock-in range of the primary modes. The ratio of c to ω is controlled to minimize $J_o(c/\omega)$ wherein $J_o$ is the Bessel Function of the first kind of zero order. In one embodiment, cavity length control circuitry is adjusted to detune the cavity length to allow two secondary opposing modes of angular frequency separation ω to be generated within laser gain medium in the cavity while two primary counterpropagating modes operate well above threshold. Another embodiment has an external laser beam source for generating two secondary waves, at two light frequencies separated by an angular frequency ω, which are introduced into the ring laser path through a partially transmitting mirror which forms one of the corners of the ring laser closed loop path. In still another embodiment, part of one of the primary waves leaves the ring laser path through a partially reflective mirror and is acted upon by a mirror oscillating at an angular frequency ω which doppler-shifts the frequency of the extracted wave. This doppler-shifted mode is reintroduced into the ring laser path to diminish the range of lock-in frequency of the primary modes. In all embodiments, the magnitude of the ratio of c/ω is controlled to minimize $J_o(c/\omega)$ to reduce the range of lock-in of the primary modes.

16 Claims, 7 Drawing Figures

LASER GYRO MODE LOCKING REDUCTION SCHEME

This is a continuation-in-part of patent application Ser. No. 68,244, filed Aug. 17, 1979 which is a full continuation of patent application Ser. No. 909,919, filed May 26, 1978, both now abandoned.

FIELD OF THE INVENTION

This invention relates to ring lasers used as gyroscopes wherein the difference between frequencies of counterpropagating radiant energy or light waves is a measure of angular velocity of the structure in which said propagating waves are traveling.

BACKGROUND OF THE INVENTION

Ring laser gyroscopes utilizing counterpropagating laser beams are well known. These devices are used for measuring rotation and angular velocity of the ring laser gyroscope by combining portions of the counterpropagating modes or waves to generate a beat frequency representative of the differences in frequency between the opposing modes or waves. The term "mode" is used herein interchangeably with the word "wave", and means a resonant traveling wave of radiant energy propagating within a ring laser cavity. As the ring laser body is rotated about its sensing axis, the frequency of waves propagating in one direction within the cavity increases while the frequency of waves propagating in the opposite direction decreases. The difference in frequency between the counterpropagating modes creates a change to the beat frequency which is proportional to the rate of rotation about the sensing axis. By measuring the beat signal, the rate of rotation of the ring laser about its sensing axis is measured.

For the ring laser gyroscope to function at low rates of rotation, frequency locking or "lock-in" must be overcome. Frequency lock-in occurs when two oppositely traveling waves in a resonant cavity which should have slightly different frequencies combine in a single frequency standing wave. Thus, for low rates of rotation of the ring laser about its sensing axis, the frequencies of the waves lock together, and the gyroscope is insensitive to small rates of rotation. The effects of lock-in are described in detail in *Laser Applications*, edited by Monte Ross, Academic Press, Inc., New York, N.Y., 1971, in the article entitled, "The Laser Gyro," by Frederick Aronowitz, pages 133-200.

It is well known that the principal cause of lock-in is the mutual scattering of energy from each of the beams into the direction of the other. This mutual scattering, or backscatter, is explained in detail in Aronowitz, supra, pages 148-153. Briefly, the difference frequency between two counterpropagating waves in a ring laser is governed by the equation $$\dot{\psi} = a + b \sin \psi$$

where $\psi$ is the instantaneous phase difference between the counterpropagating waves, $a = k\Omega$ where k is a proportionality constant and $\Omega$ is the rate of angular velocity of the ring laser about its sensing axis, and b is proportional to the magnitude of backscattered energy. Where a is smaller than b the beat frequency is equal to zero and the frequencies of the counterpropagating ring laser modes are the same. To have a gyroscope output signal which is a measure of rotational rate, $\Omega$, of the ring laser body, a must be greater than b.

One way of eliminating lock-in is to oscillate the ring laser body mechanically. By mechanically oscillating, or dithering, the laser structure, a rotation rate is superimposed on the gyroscope such that most of the time a is greater than b, and the effects of b are minimized or eliminated. A gyro employing mechanical dither is discussed in U.S. Pat. No. 4,115,004 entitled "Counterbalanced Oscillating Ring Laser Gyro," which issued Sept. 19, 1978 to Thomas J. Hutchings and Virgil E. Sanders and which is assigned to the same assignee as this patent.

Another method of minimizing the effects of lock-in is the directional dither of the magnetic field of a Faraday cell disposed within a ring laser path. Within the ring laser cavity, linearly polarized laser waves are converted to circularly polarized light whose vector rotates in the same direction as the windings in the Faraday cell. The circularly polarized light waves react with the magnetic field as they pass through the Faraday cell, and an effective increase or decrease in optical path length occurs, depending upon the direction of the field and the direction which the waves are traveling. After leaving the Faraday cell, the circularly polarized light is converted back to linearly polarized light. By oscillating the current in the Faraday cell windings, the magnetic field oscillates and varies the effective optical path lengths of the oppositely propagating waves in a nonreciprocal manner. Magnetic dithering using a Faraday cell is explained in Aronowitz, supra, pp. 157 through 159.

The above-described antilock-in techniques are passive, i.e., they are not dependent upon the active laser gain media. With those methods the effects produced on waves propagating in one direction in the laser path are equal and opposite to the effects produced on the waves traveling in the opposite direction.

SUMMARY OF THE INVENTION

The two opposing resonant modes in a conventional ring laser cavity which are combined to yield rotational information are referred to as "primary modes".

It is an object of this invention to minimize lock-in between primary counterpropagating modes in a ring laser cavity by introducing at least one additional mode into the ring laser cavity. These additional modes, called "secondary modes", produce an antilock-in effect.

For example, in one embodiment of the invention, four oscillating resonant modes are generated within the ring laser cavity. These four modes may be generated by detuning the laser cavity such that the two primary modes operate at a frequency slightly off-center from the center of the laser gain curve while two weaker secondary modes oscillate at frequencies on the gain curve only slightly above threshold. Threshold is defined as that amplitude of the gain curve where a resonant mode begins to be amplified in the laser gain medium. The secondary modes produce a dither effect, whose frequency is equal to the difference frequency of the secondary modes, on $\dot{\psi}$. By adjusting the amplitude and angular frequency of the dither, the effect on $\dot{\psi}$ is to counteract the lock-in component of the equation and reduce or eliminate it.

Another embodiment of the invention includes injecting two perturbing secondary modes, having a difference frequency $\omega$, from an external laser source. The injected modes, one traveling in each direction, produce a dithering effect in the measured $\dot\psi$. By adjusting the amplitude and difference frequency of the secondary modes, lock-in is reduced or eliminated.

An additional embodiment of the invention extracts a portion of the energy of one of the two primary counterpropagating waves of the ring laser. The extracted portion is frequency modulated at a frequency $\omega$ to alter its frequency. The modulated signal is injected back into the ring laser. By adjusting $\omega$ and the amplitude of the modulation, lock-in is minimized.

It is also an object of the invention to combine portions of the principal modes to obtain signals representative of the rate and direction of rotation of the laser gyroscope. Also, the invention includes apparatus for monitoring and optimizing the cavity length of the laser gyroscope so that the resonant modes oscillate at the disired position of the gain versus frequency curve.

Other objects, features and advantages of the invention will become apparent from consideration of the detailed description and drawings.

DETAILED DESCRIPTION OF THE INVENTION

The difference frequency or beat frequency from optically combining the two primary opposing resonant modes within a ring laser cavity is governed by the expression $$\dot\psi = a + b \sin \psi$$

where $\psi$ is the instantaneous phase difference between the opposite traveling waves, $a = k\Omega$, where k is a proportionality constant and $\Omega$ is the rotation rate of the ring laser gyroscope, and b is a proportional of the magnitude of the backscattered energy. The second term on the right hand side of the equation (b sin $\psi$) represents the coupling which results from backscatter. For small rates of rotation, wherein a is smaller than b, $\dot\psi$ goes to zero. The ring laser gyroscope frequencies are locked together, and their beat is not a measure of the actual rotation rate $\Omega$. Thus, at small but finite rotation rates the ring laser does not function well as a gyroscope.

By physically modifying the ring laser such that the beat frequency is perturbed sinusoidally, an additional time varying term is added to the above equation to modify it to read $$\dot\psi = a + b \sin \psi + c \cos \omega t$$

In the new equation, c and $\omega$ represent the amplitude and frequency respectively of the perturbation imposed on the difference frequency $\dot\psi$.

Solving this new equation for $\psi(t)$, a good approximation is $$\psi(t) = at - (b/a)J_o(c/\omega) \cos (at)$$

If the values of c and $\omega$ are chosen such that $J_o (c/\omega) =$ zero this equation reduces to $$\psi(t) = at,$$

and the lock-in term of the original $\dot\psi$ equation is eliminated.

In the following discussion of the invention, such an additional perturbing effect, c cos $\omega t$, on the difference frequency $\dot\psi$, of the primary modes, is accomplished by introducing additional modes or waves into the ring laser cavity. By controlling the magnitude and frequency of the secondary modes, the term c and $\omega$ may be manipulated to diminish the range of lock-in frequencies of the primary modes.

Figure 1:
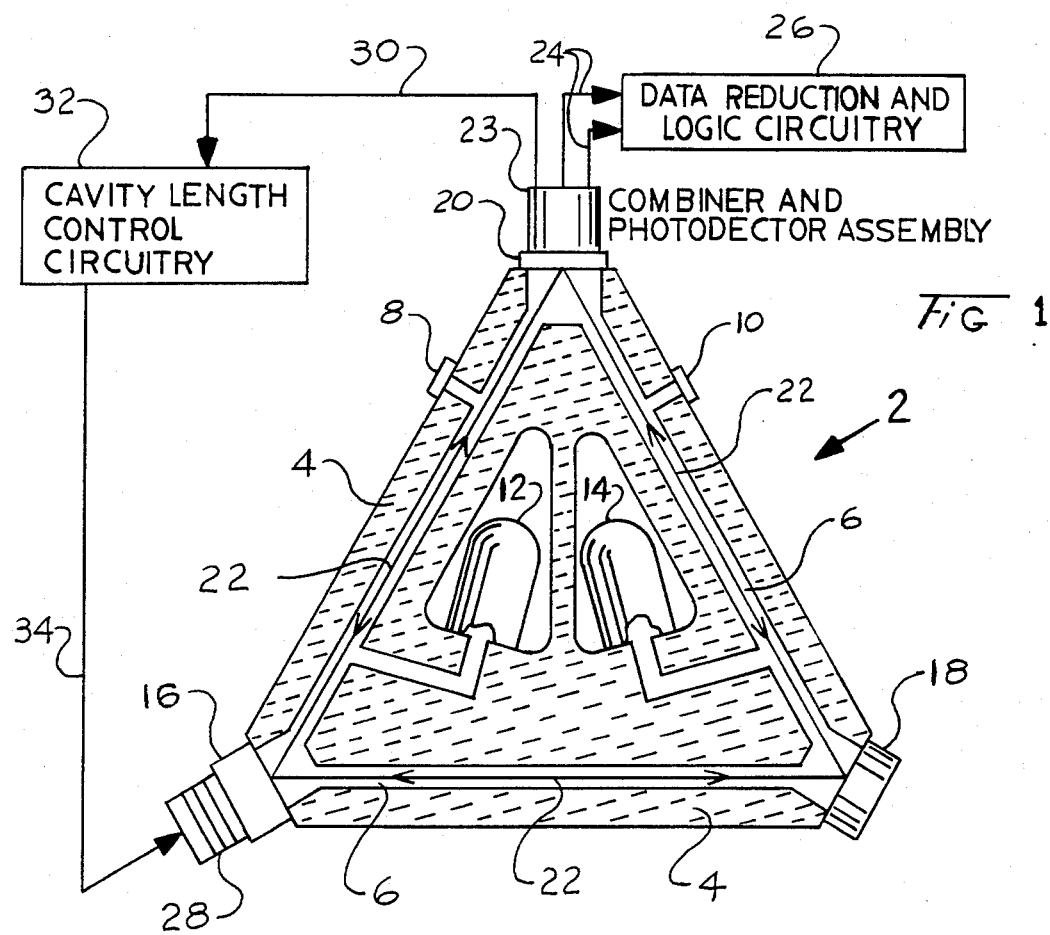
FIG. 1 shows a first embodiment of the invention where the cavity length control circuitry adjusts cavity length to support two strong primary modes and two weaker secondary modes by the gain medium.

FIG. 1 shows a ring laser gyroscope 2. The laser body 4 is made of quartz, and a sealed cavity 6 within the laser body is typically filled with 90% helium and 10% neon. Two anodes 8 and 10 and two cathodes 12 and 14 are attached to the cavity 6. The gas mixture in the gain regions of the cavity between the cathode 12 and anode 8 and between cathode 14 and anode 10, respectively, are electrically charged to provide a gas plasma which serves as the amplification or gain medium for generating and amplifying the resonant laser modes within the cavity 6. Three dielectric mirrors 16, 18 and 20 are located at the three corners of the triangular shaped resonant cavity 6. These mirrors comprise multiple layers of dielectric coatings which are well known in the art.

Mirror 20 is a partially reflective mirror. Portions of the two primary counterpropagating modes, which travel in the cavity 6 along the path represented by line 22, pass through the mirror 20 and are combined in a prism structure (not shown) within the combiner and photodetector assembly 23 to form a fringe pattern. This fringe pattern is received by one or more photosensitive detectors (not shown), and the signals generated are transmitted by leads 24 to standard data reduction and logic circuitry 26 which determine the rate and direction of sensed rotation. A more detailed discussion of combining counterpropagating waves and processing the information obtained therefrom is included in Aronowitz, supra, page 139 through 141.

The gain versus frequency characteristic of the ring laser is controlled by varying the cavity length, i.e., the distance that the laser modes travel in completing one full loop around the path 22. It is conventionally desired to adjust or tune the cavity length such that only two modes resonate within the cavity, and they are in the center, at the maximum amplification, of the intensity distribution curve (gain curve) for a particular laser gain medium. To adjust the cavity length, mirror 16 is attached to the laser body 4, and attached to the back of mirror 16 is a stack of piezoelectric elements for moving the mirror inwardly and outwardly. Typical cavity length control is accomplished by oscillating, or dithering, the mirror 16 inwardly and outwardly by applying an AC voltage to the piezoelectric elements 28. As the mirror 16 is oscillated at a given frequency, the intensity of the signal generated in the photodetector assembly 23 varies and is transmitted to a conventional closed loop cavity length control circuitry 32. Circuitry 32 increases or decreases the electric signal delivered to the piezoelectric elements 28 to control the gain versus frequency curve 44 (See FIGS. 2 and 3). A thorough discussion of the type of circuitry 32 is contained in NASA Report No. Cr-132261, "Design and Development of the AA1300Ab02 Laser Gyro," by T. J. Podgorski and D. N. Thymian, 1973, pages 10 and 11.

Figure 2:
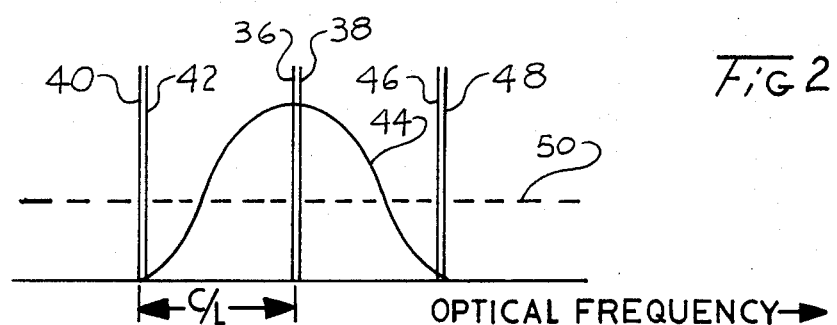
FIGS. 2 and 3 illustrate how the optical frequency of the resonant cavity is tuned so that the resonant waves in the cavity operate at desired points on the laser gain curve.

FIG. 2 shows a typical laser gain curve 44, i.e., the intensity distribution of light emitted in the laser gain plasma versus the otpical frequency of such emitted light. Only frequencies where the gain is greater than the threshold 50 may resonate, i.e., be amplified, within the ring laser cavity. The frequency spacing between possible resonant modes is determined by the speed of light (C) divided by the path length (L), or the distance a wave makes in completing one full loop around the laser path. Lines 36 and 38 represent the clockwise and counterclockwise primary modes, respectively, which exist at a given frequency when the ring laser cavity is tuned to the center of the gain curve 44. Lines 40 and 42 and lines 46 and 48 represent the nearest modes on the optical frequency scale which could also exist within the cavity, except that the gain medium will not amplify these other modes without detuning the cavity 6.

Figure 3:
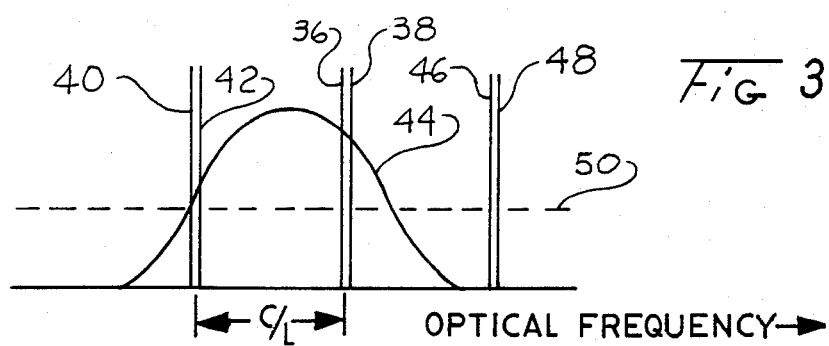

For the embodiment of the invention in FIG. 1, detuning of the cavity length produces dithering of the difference frequency $\psi$. The DC component of the electrical signal delivered to the piezoelectric elements 28 detunes the cavity length to cause the principal modes 36 and 38 to be moved from the center of the gain curve. Sufficient detuning allows secondary resonant waves to oscillate above the threshold 50 and to be amplified by the resonant cavity 6. FIG. 3 shows how the cavity length is adjusted so that resonant modes 36 and 38 are moved off the center of the gain curve 44 sufficiently to allow secondary waves 40 and 42 to oscillate slightly above threshold on the gain curve.

The effects of the perturbing modes 40 and 42 are governed by the term c cos $\omega$t in the $\psi$ equation. By detuning the cavity 6, the intensity of the secondary modes on the gain curve of modes 40 and 42 as well as the frequencies at which they oscillate, c in the equation can be controlled to diminish the effects of lock-in. The frequencies 40 and 42 are separated by an amount $\omega$ which varies with $\Omega$, where a=k$\Omega$, $\Omega$ is the angular velocity being measured, and k is a proportionality constant. It has been found that for low values of $\Omega$, wherein the primary modes 36, 38 are locked, there is a range of $\Omega$ wherein the lower amplitude secondary modes 40 and 42 do not lock. That is, the lock-in threshold for the secondary modes occurs at a lower $\Omega$ than for the primary modes 36 and 38. Consequently, there exists an $\omega$ which varies with $\Omega$ over a portion of the lock-in region of the primary modes. The amplitude "c" of the component (c cos $\omega$t) can be varied by changing the gain by detuning of the ring laser. As well, the $\omega$ is not externally controllable. Consequently, the ratio c/$\omega$, and $J_o$(c/$\omega$), cannot be as accurately controlled in this embodiment as in the embodiments described below in connection with FIGS. 5 and 6. The lock-in frequency range of the primary modes, however, in the embodiment of FIG. 1 is substantially reduced, but it is not reduced to zero. Without correction, the lock-in occurs as shown at A in FIG. 7. With the correction of FIG. 1, the lock-in occurs at a lower $\Omega$ as shown at B in FIG. 7.

Figure 4:
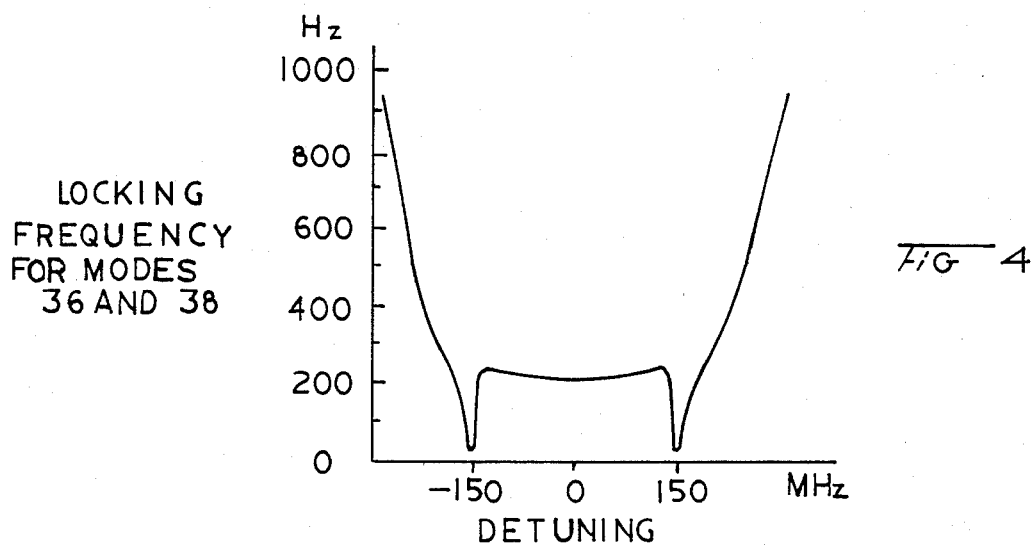
FIG. 4 illustrates how detuning a laser cavity to allow weaker counterpropagating secondary modes to exist with stronger primary modes reduces frequency lock-in of two opposing primary modes.

FIG. 4 is a graph illustrating how detuning affected the lock-in frequency between primary modes 36 and 38 in a particular experiment. Note in FIG. 4 that for a particular embodiment, lock-in was substantially but not completely eliminated when the cavity path length was detuned to where the primary modes were 150 megahertz from the center of the gain curve.

Figure 5:
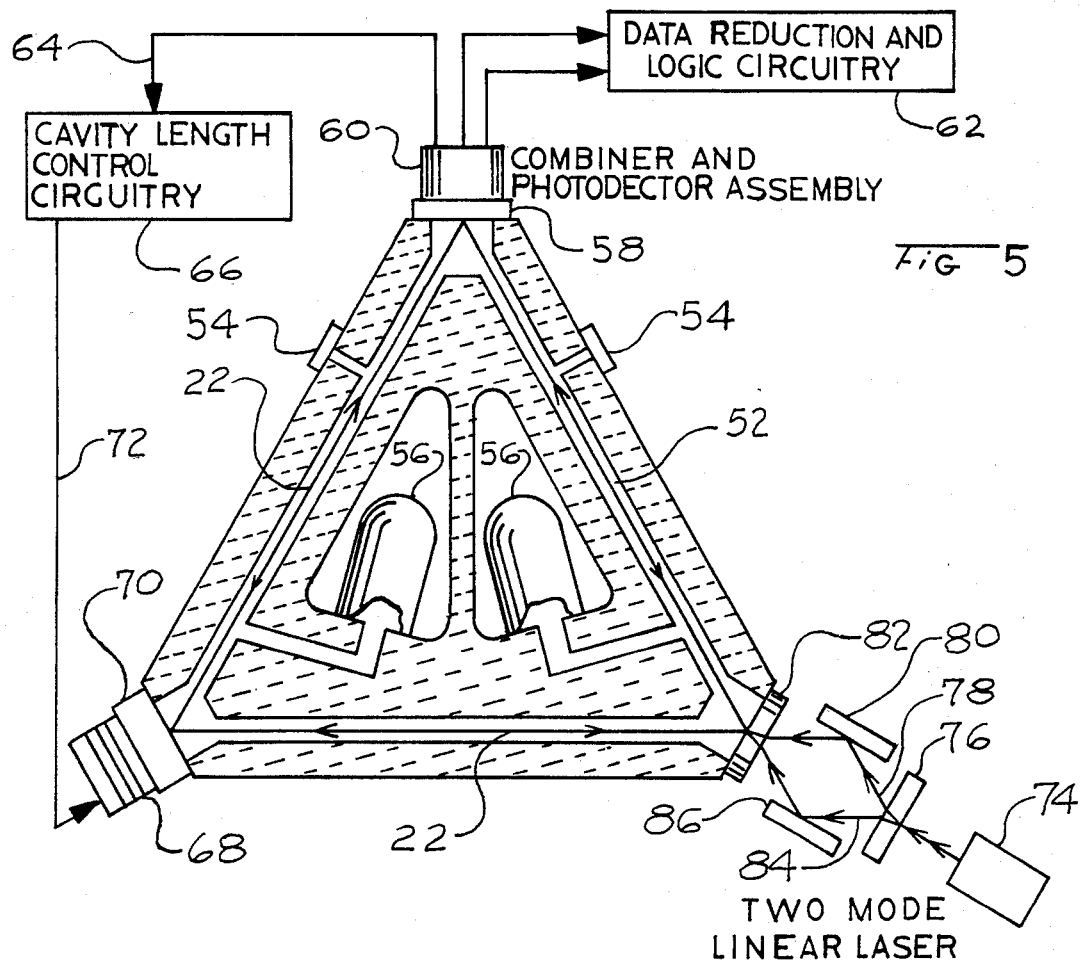
FIG. 5 is a second embodiment of the invention where secondary modes are genrated by an outside laser source and injected into the resonant cavity.

Another embodiment of the invention is shown in FIG. 5. A two mode ring laser, similar to the ring laser gyroscope shown in FIG. 1, has a sealed cavity 52 that typically contains 90% helium and 10% neon which, when electrically excited between anodes 54 and cathodes 56, comprises the laser gain medium. Portions of two primary counterpropagating waves in the cavity are extracted through a partially transparent dielectric mirror 58 into a combiner and photodetector assembly 60 where signals are generated and transmitted to a data reduction and logic circuitry 62. An AC signal generated in the cavity length control circuitry 66 is delivered to a piezoelectric stack 68 to dither mirror 70, and to oscillate the cavity length of the gyroscope. Intensity signals are transmitted from the combiner and photodetector assembly 60 to the cavity length control circuitry 66. The DC component of the signal transmitted to the piezoelectric stack controls the cavity length to maximum intensity of the counterpropagating waves. The cavity length is adjusted so that the resonant modes 36, 38 are positioned substantially at the peak of the gain curve.

In the embodiment of the invention in FIG. 5, perturbing secondary waves at two frequencies, separated by a frequency $\omega$, and different from the frequencies of the primary resonant modes in the laser gyro, are injected from an external laser source 74. Two injected modes travel colinearly to the dispersive element 76. Such dispersive elements are well known in the art and may comprise a grating for diffracting different frequencies by different amounts. One secondary mode 78 is diffracted onto dielectric mirror 80 where it is reflected onto the partly transmitting mirror 82. Mode 78 enters the ring laser cavity 52 in the clockwise direction. The secondary mode 84 is diffracted by the dispersive element 76 onto mirror 86 and then through mirror 82, entering the cavity 52 in the counterclockwise direction.

The perturbing effect of the secondary modes introduced into the cavity is represented by the $\psi$ difference frequency equation by the term c cos $\omega$t. The amplitude portion c is proportional to the magnitude of signals 78 and 84 and to the magnitude of the difference frequency signal between the secondary modes in the cavity. The term c and $\omega$ may be manipulated to diminish lock-in by controlling the transmittance of mirror 82 and the frequencies and magnitudes of the signals generated by the linear laser 74.

Figure 6:
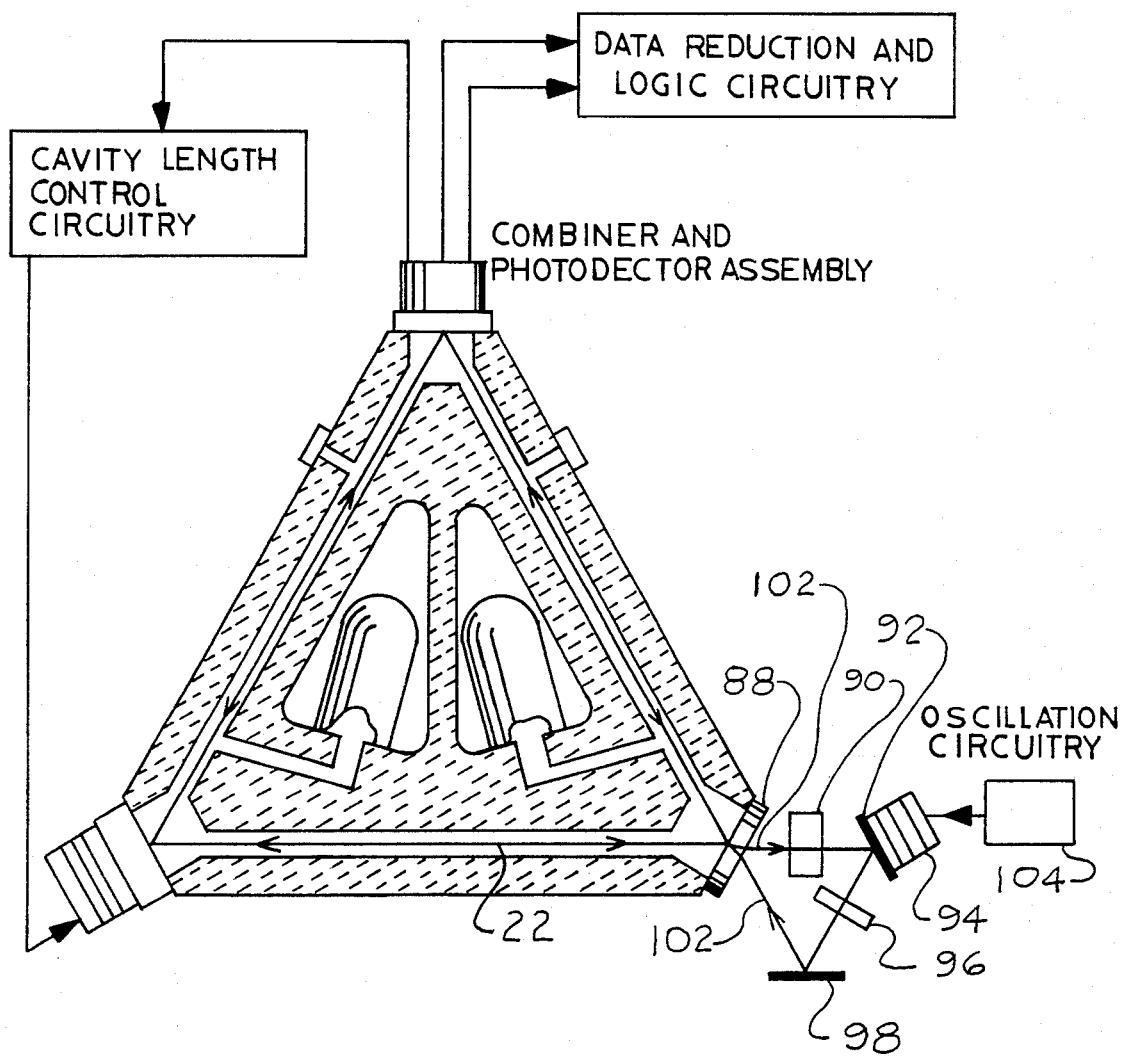
FIG. 6 shows a third embodiment of the invention wherein a portion of one primary mode is extracted from a ring laser cavity, frequency modulated and reinjected into the laser cavity.
Figure 7:
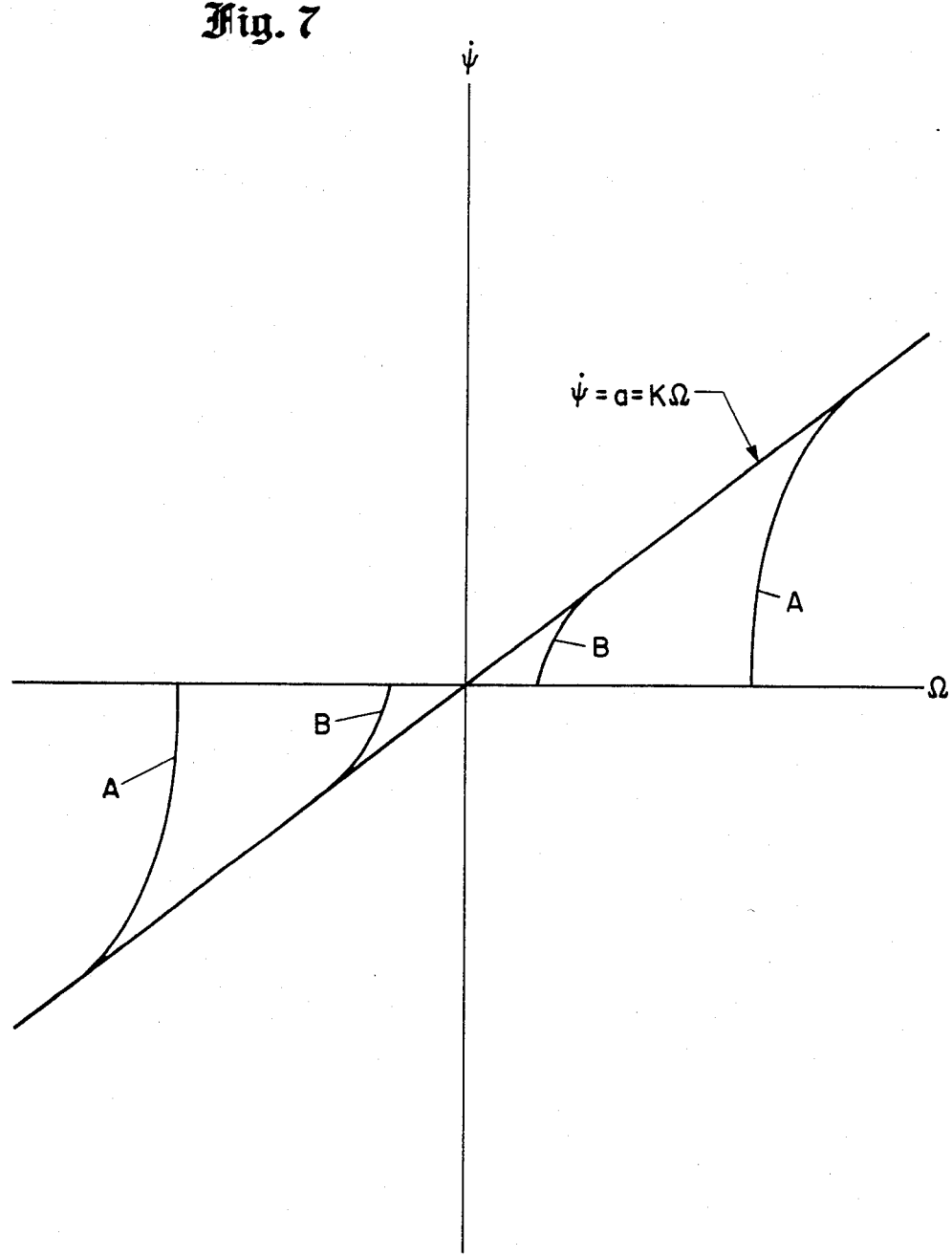
FIG. 7 is a graph of the output frequency of the ring laser as a function of the incident angular velocity in the embodiment of FIG. 1.

FIG. 6 shows a third embodiment of the invention. This embodiment uses a triangular ring laser gyroscope similar to the ring lasers shown in FIGS. 1 and 5. Cavity length control circuitry adjusts the piezoelectric stack to create a maximum intensity output signal from the ring laser gyroscope. The two opposing primary modes propagating in the cavity along path 22 have frequencies tuned substantially to the peak of the laser gain curve 44 of FIGS. 2 and 3.

In the device shown in FIG. 6, one perturbing secondary mode is introduced in the ring laser cavity. To obtain the secondary mode, a portion of the counterclockwise primary mode in path 22 passes through the partially transmitting dielectric mirror 88 then through a directional isolator 90. Such directional isolators are well known in the art and operate to change the angle of polarization of the traveling waves passing through it. The mode 102 then strikes the dielectric mirror 92 which is oscillated by a piezoelectric stack 94. Oscillation circuitry 104 drives the piezoelectric stack 94, at an angular frequency $\omega$, to oscillate mirror 92. The mirror oscillation frequency modulates the frequency of mode 102. The modulated signal is deflected from dielectric mirror 98 and reinjected through the partly transmitting mirror 88 into the ring laser path. The frequency modulated wave produces the antilock-in dithering effect $c \cos \omega t$ on $\psi$.

The magnitude of the frequency modulated signal 102 which reenters the cavity is proportional to c, and the c term amplitude is controlled by controlling the magnitude of 102. This magnitude of 102 may be controlled by controlling the transmittance of the partly transmitting dielectric mirror 88. The $\omega$ term in the difference frequency equation is easily controlled by varying or controlling the frequency of oscillation generated in the circuitry 104. Therefore, by controlling the magnitude and frequency of oscillation of mode 102 when it reenters the laser cavity, the effects of lock-in are substantially diminished.

A polarizer 96 disposed in the path of mode 102 allows beams of one sense of polarization to pass through while blocking out beams having a different sense of polarization. Polarizer 96 is adjusted to allow beam 102 to pass through. Since the direction isolator 90 has changed the sense of polarization of mode 102, portions of the clockwise propagating principal mode which pass through mirror 88 have different polarization and are blocked out by the polarizer 96.

Changes may be made to the above described embodiments of my invention and still be within its scope and spirit. Examples of such changes include, but are not limited to, using a rectangular shaped ring laser path, using means other than piezoelectric stacks for oscillating dielectric mirrors, using alternate cavity length control apparatus, using no cavity length control device, and using different means for combining and processing primary counterpropagating beams to obtain rotational information.

What is claimed is:

1. A ring laser gyroscope comprising:
   a ring laser body including reflective surfaces which define a closed loop optical path;
   means including electrically charged gas plasma, gain medium means and means for controlling and tuning the length of said optical path for generating, amplifying, and maintaining at least two stronger counter propagating primary resonant traveling modes and for generating, amplifying and maintaining at least two weaker counter propagating secondary modes propagating in said optical path;
   means for processing the frequency beat signal between said primary modes to generate signals representative of angular velocity of said ring laser body about its sensing axis; and
   said means for controlling and tuning the length of said optical path being adjusted such that the amplitude of at least said two weaker counterpropagating secondary modes within said gain medium means to diminish lock-in between said primary modes.

2. Apparatus as recited in claim 1 in which $c/\omega$ is adjusted so that $J_0(c/\omega)$ is minimized; where c is the amplitude and $\omega$ is the angular beat frequency of said secondary modes.

3. A ring laser gyroscope comprising:
   a ring laser body including reflective surfaces which define a closed loop optical path;
   means for generating and maintaining at least two counter propagating primary resonant traveling modes propagating in said optical path;
   means for processing the frequency beat signal between said primary modes to generate signals representative of angular velocity of said ring laser body about its sensing axis;
   means external to said ring laser body for generating at least one secondary mode having a frequency different from said primary modes and a ratio of amplitude to frequency such that $J_0$ of that ratio is minimized; and
   means for introducing said external mode or modes into said optical path to reduce lock-in effects between said primary modes.

4. A ring laser gyroscope comprising:
   a ring laser body including reflective surfaces which define a closed loop optical path;
   means for generating and maintaining at least two counter propagating primary resonant traveling modes propagating in said optical path;
   means for processing the frequency beat signal between said primary modes to generate signals representative of angular velocity of said ring laser body about its sensing axis;
   means for extracting a portion of at least one of said primary modes from said closed loop path;
   oscillating frequency modifying means disposed in the path of said extracted mode for frequency modulating the frequency of said extracted mode; and
   means for for controlling the ratio of amplitude to frequency of said abstracted mode and for introducing said frequency-modified mode into said path to cause an oscillation which reduces lock-in between said primary modes.

5. Apparatus as recited in claim 4 in which $c/\omega$ is adjusted so that $J_0(c/\omega)$ is minimized; where c is proportional to the amplitude and $\omega$ is the angular frequency of the modulation of said secondary mode.

6. A ring laser gyroscope comprising:
   a ring laser body including reflective surfaces which define a closed loop optical path;
   means for generating and maintaining two counter propagating primary resonant traveling modes propagating in said optical path;
   means for generating and maintaining two secondary resonant modes propagating in said path;
   means for processing the frequency beat signal between said primary modes to generate signals representative of angular velocity of said ring laser body about its sensing axis;
   $c/\omega$ being adjusted so that $J_0(c/\omega)$ is minimized, where c is the amplitude and $\omega$ is the angular beat frequency of said secondary modes.

7. A ring laser comprising:

a ring laser body including reflective surfaces which define a closed loop optical path;

means for generating and maintaining at least two counterpropagating primary resonant traveling modes propagating in said optical path;

means for generating and maintaining one secondary resonant traveling mode propagating in said path and coupling with at least one of said primary modes;

electrically charged gas plasma gain medium means for generating and amplifying said primary modes and said secondary mode; and means for controlling the length of said optical path to tune the length of said path such that at least two stronger counterpropagating said primary modes are generated and amplified within said gain medium means and the amplitude and frequency of said secondary mode are controlled such that the Bessel function of the first kind of zero order of the ratio of its amplitude to its angular frequency is minimized.

8. A ring laser comprising:

a ring laser body including reflective surfaces which define a closed loop optical path;

means for generating and maintaining at least two counterpropagating primary resonant traveling modes propagating in said optical path;

means external to said ring laser body for generating one secondary mode having a frequency different from said primary modes and having both amplitude and angular frequency such that the Bessel function of the first kind of zero order of the ratio of such amplitude to angular frequency is minimized; and means for introducing said external mode into said optical path to couple with at least one said primary mode.

9. A ring laser comprising:

a ring laser body including reflective surfaces which define a closed loop optical path;

means for generating and maintaining at least two counterpropagating primary resonant traveling modes propagating in said optical path;

means for extracting a portion of at least one of said primary modes from said closed loop path;

oscillating frequency modifying means disposed in the path of said extracted portion for frequency modulating the frequency of said extracted portion; and means for introducing said frequency modified portion into said path to couple with at least one of said primary modes.

10. Apparatus as recited in claim 9 in which $c/\omega$ is adjusted so that $J_0(c/\omega)$ is minimized; where c is the amplitude and $\omega$ is the angular frequency of the modulation os said secondary traveling wave portion.

11. A ring laser comprising:

a ring laser body including reflective surfaces which define a closed loop optical path;

means for generating and maintaining at least two counterpropagating primary resonant traveling modes propagating in said optical path;

means for generating and maintaining at least one secondary resonant traveling mode propagating in said path and coupling with at least one of said primary modes;

$c/\omega$ being adjusted so that $J_0(c/\omega)$ is minimized, where c is proportional to the amplitude and $\omega$ is the angular frequency of a component of said secondary traveling wave mode.

12. A ring laser structure comprising:

a ring laser body including reflective surfaces which define a closed loop optical path;

means for generating and maintaining at least two counterpropagating primary traveling modes propagating along said optical path; and means for generating and maintaining at least one secondary mode propagating in said path including a component of the form $c \cos \omega t$, where c is the amplitude of said component and $\omega$ is the angular frequency of said component, and where c and $\omega$ have a ratio such that the amplitude of $J_0(c/\omega)$ is minimized.

13. A ring laser structure according to claim 12 and comprising means for controlling the length of said optical path for tuning the path length to control the amplitude c of said component.

14. A ring laser structure according to claim 13 wherein the means for generating and maintaining primary modes and at least one secondary mode comprise electrically chargeable gas plasma gain medium means, for generating and amplifying said primary and secondary modes, and said controlling means, the controlling means being arranged so as to control the length of said path such that the amplitude c of at least two weaker counter propagating secondary modes and at least two stronger counterpropagating primary modes are generated and amplified within said gain medium means.

15. A ring laser structure according to claim 12 wherein said means for generating at least one secondary mode comprises means external to said optical path for producing two counterpropagating secondary modes having a difference frequency therebetween of $\omega$ to reduce the lock-in range of the primary modes.

16. A ring laser structure according to claim 12, wherein said means for generating and maintaining at least one secondary mode comprises means for extracting a portion of at least one of said primary modes from said closed loop path, oscillating frequency modifying means, oscillating at a frequency $\omega$, disposed in the path of said extracted mode for modifying the frequency of said extracted mode, and means for introducing said frequency modified mode into said path to reduce the range of lock-in between said primary modes.

* * * * *